United States Patent [19]

Shih et al.

[11] Patent Number: 5,617,546
[45] Date of Patent: Apr. 1, 1997

[54] DATA BUS ARCHITECTURE COMPATIBLE WITH 32-BIT AND 64-BIT PROCESSORS

[75] Inventors: Kuo-Piao Shih, Taoyuan; Wen-Lu Liao; Yann-Lang Chung, both of Taipei, all of Taiwan

[73] Assignee: Acer Incorporated, Taipei, Taiwan

[21] Appl. No.: 584,705

[22] Filed: Jan. 11, 1996

Related U.S. Application Data

[63] Continuation of Ser. No. 178,396, Dec. 22, 1993, abandoned.

[51] Int. Cl.$^6$ ........................................... G06F 13/00
[52] U.S. Cl. .......................... 395/307; 395/280; 395/281
[58] Field of Search ................................ 395/307, 280, 395/281

[56] References Cited

U.S. PATENT DOCUMENTS 4,443,846  4/1984  Adcock ................................. 395/500
5,301,281  4/1994  Kennedy ............................... 395/325
5,321,827  6/1994  Lu et al. ............................... 395/500

*Primary Examiner*—Jack B. Harvey
*Assistant Examiner*—John Travis
*Attorney, Agent, or Firm*—Townsend and Townsend and Crew LLP; Joseph M. Villeneuve

[57] ABSTRACT

A removable CPU module for use in a data processing system. The CPU module includes at least one CPU having a first data width, and a first data bus of the same data width coupled to the CPU. A connector is coupled to the first data bus for connecting to a circuit board having a second data bus. The second data bus has a second data width which is different from the first data width. The CPU module is configured such that it is compatible with the second data bus. In one embodiment, the removable CPU module includes a third data bus coupled to the first data bus and the connector, which is a duplicate of and connected in parallel with the first data bus. The third data bus facilitates compatibility between the CPU module and the second data bus.

12 Claims, 13 Drawing Sheets

DATA BUS ARCHITECTURE COMPATIBLE WITH 32-BIT AND 64-BIT PROCESSORS

This is a continuation of application Ser. No. 08/178,396, filed Dec. 22, 1993, now abandoned.

BACKGROUND OF THE INVENTION

The present invention relates generally to a computer system in which the central processing unit (CPU) may be upgraded. More specifically, the computer system of the present invention is designed for compatibility between 32-bit and 64-bit processors as well as between single and multi-processor systems.

With the rapid pace of development in CPU technology, obsolescence is a problem to both the manufacturers and the users of personal computers. A product which employs state of the art technology at the time of its initial marketing may become obsolete within a year or less. Personal computers employing 80286 CPUs are current examples. These obsolete computer systems remain operable, but often lack the capability of running software designed for use with systems having more advanced CPUs. In order to run such software on their existing hardware, users are forced to upgrade their systems, and in the process are faced with the following questions: Given a particular system's application, what level of upgrade is required to keep abreast of the current developments in processor and software technology (e.g., would an 80386 provide sufficient computing power, or is an upgrade to a more powerful processor, an 80486 for example, necessary)? What is the most economical way to expand a computer system from a single processor system to a multi-processor computer system in the event that the computing power of a single processor system is insufficient?

There are existing alternatives to the impractical solution of buying a new computer each time a new CPU is developed. One solution involves providing a specially designed CPU circuit board in the original system on which a prepared location (e.g., an IC socket) is provided for inserting a second CPU when the original CPU on the board requires an upgrade. Upon insertion of the new CPU into the prepared location, the original CPU is disabled. Such a specially designed circuit board is described in copending U.S. patent application Ser. No. 07/872,611 for Upgradeable/Downgradeable Central Processing Unit Chip Computer System, filed on Apr. 22, 1992, and copending U.S. patent application Ser. No. 07/998,879 for Single Chip Replacement Upgradeable/Downgradeable Data Processing System, filed on Dec. 28, 1992, both of which are herein incorporated by reference in their entirety. Commonly assigned U.S. patent application Ser. No. 07/689,317 filed on Apr. 22, 1991 and U.S. patent application Ser. No. 07/748,780 filed on Aug. 22, 1991, both also describe approaches for upgrading a computer system's CPU.

However, while various design options for upgrading CPUs are available, computer systems which can easily switch from a 32-bit CPU (e.g., 80386, 80486) to a 64-bit CPU (e.g., Intel's Pentium (p5)) are lacking. This is largely due to the incompatibility of a 32-bit wide data path and a 64-bit processor. Furthermore, no computer systems are presently available which may be upgraded from a lower generation single-processor to a higher generation multi-processor simply by swapping a CPU module and/or inserting an extra CPU.

In view of the foregoing, there is a need for a computer system in which the user may easily upgrade the system's CPU from a 32-bit processor to a 64-bit processor merely by changing CPU modules in a module interface slot built into the main circuit board. It is further desirable that such a system facilitates not only upgrades from 32-bit processing to 64-bit processing, but also from a single-processor system to a multi-processor system.

SUMMARY OF THE INVENTION

The present invention provides a computer system the design of which facilitates the upgrade of the system processor from a 32-bit to a 64-bit processor. The invention also provides a system which can easily be converted from a single processor to a multi-processor system. The system provides a main circuit board on which the system memory is located. A 64-bit data bus connects the system memory to a module interface slot mounted on the main circuit board into which interchangeable CPU modules may be inserted. For example, the system, initially employing a CPU module having a 486 processor and a 32-bit data bus, may be upgraded by removing the CPU module and replacing it with a new CPU module having two Pentium processors and a 64-bit data bus. The bus configuration of the CPU modules designed according to the invention eliminate the incompatibility problems described above.

According to the invention, a removable CPU module for use in a data processing system is provided. The CPU module includes at least one CPU having a first data width, and a first data bus of the same data width coupled to the CPU. A connector is coupled to the first data bus for connecting to a circuit board having a second data bus. The second data bus has a second data width which is different from the first data width. The CPU module is configured such that it is compatible with the second data bus. In one embodiment, the removable CPU module includes a third data bus coupled to the first data bus and the connector, which is a duplicate of and connected in parallel with the first data bus. The third data bus facilitates compatibility between the CPU module and the second data bus.

In a specific embodiment, the CPU is a 32-bit microprocessor, the first data width is 32-bits, and the second data width is 64 bits. In a more specific embodiment, the CPU is a 486 microprocessor. In still another embodiment, the connector includes connector pins, each connector pin which corresponds to a signal line in the first data bus being electrically connected to another connector pin. These duplicate connector pins facilitate compatibility between the CPU module and the second data bus.

According to one embodiment of the present invention, a data processing system is provided which includes a first circuit board. The first circuit board has a first data bus of a first data width, and a module interface coupled to the first data bus. The system also includes a removable CPU module. The CPU module is equipped with at least one CPU of a second data width, the second data width being different from the first. The CPU module also has a second data bus of the second data width coupled to the CPU, and a connector coupled to the second data bus for connecting to the module interface of the first circuit board. The CPU module is configured such that the CPU module is compatible with the first data bus. In one embodiment, the CPU module further includes a third data bus coupled to the second data bus and the connector, which is a duplicate of and connected in parallel with the second data bus, thereby facilitating compatibility between the CPU module and the first data bus.

In a specific embodiment of the data processing system, the CPU is a 32-bit microprocessor, the first data width is 64 bits, and the second data width is 32 bits. In a more specific embodiment, the CPU is a 486 microprocessor. In yet another embodiment, the connector includes connector pins, each connector pin which corresponds to a signal line in the second data bus being electrically connected to another connector pin, thereby facilitating compatibility between the CPU module and the first data bus.

A further understanding of the nature and advantages of the present invention may be realized by reference to the remaining portions of the specification and the drawings.

DESCRIPTION OF THE SPECIFIC EMBODIMENTS

Figure 1:
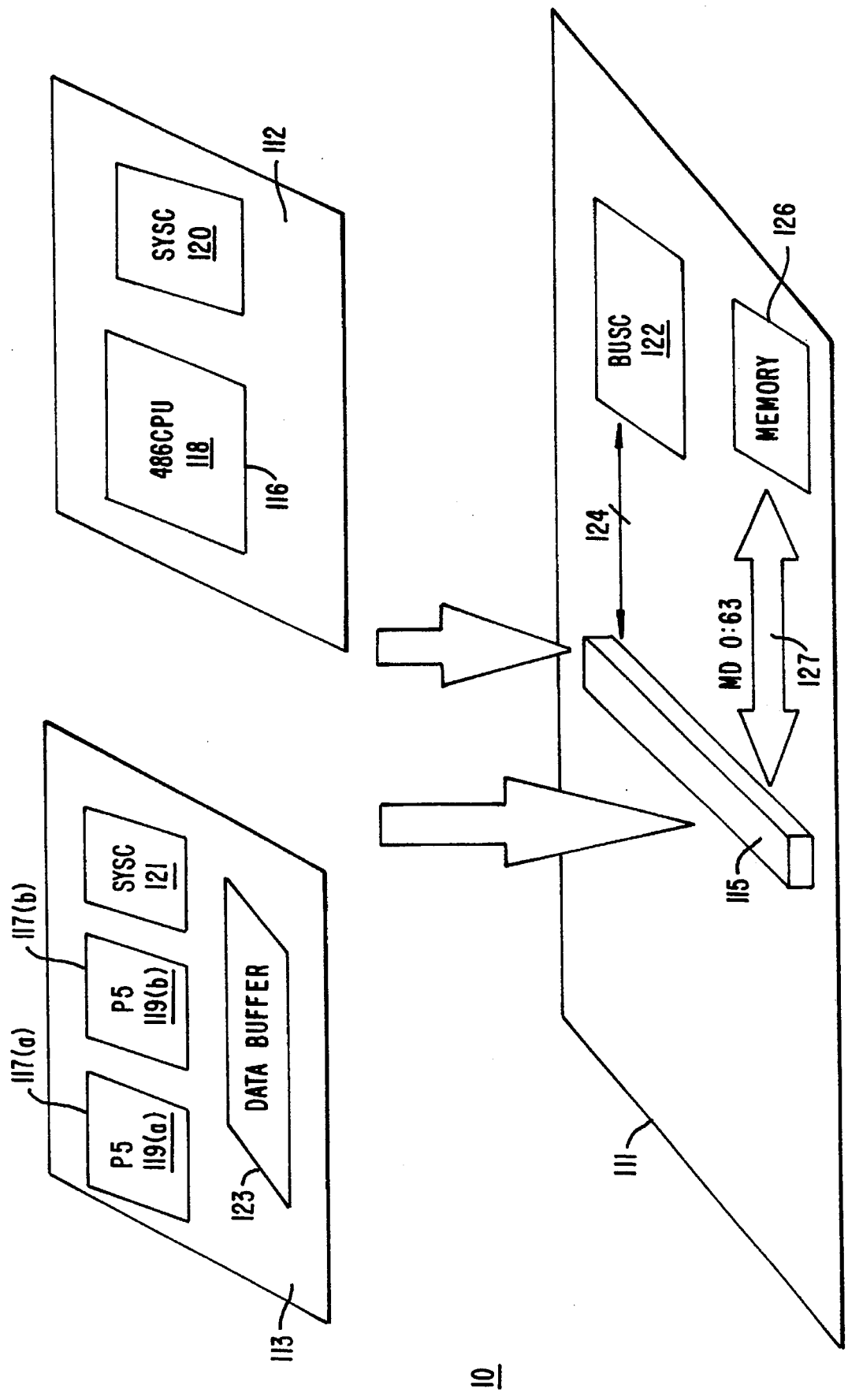
FIG. 1 is a simplified block diagram of a computer system designed according to a specific embodiment of the invention.

A specific embodiment of the present invention will be described with reference to FIGS. 1 through 6. FIG. 1 is a simplified block diagram of a computer system designed according to the present invention. Computer system 10 includes a main circuit board 111 having a module interface slot 115 mounted thereon. Either one of CPU modules 112 and 113 may be inserted into module interface slot 115 to produce a complete data processing system. Module 112 has one socket 116 mounted thereon for accommodating an Intel 486 series CPU 118. Module 112 also has a system controller (SYSC) 120 dedicated for use by CPU 118 (an OPTI 82C691 chip is employed in this embodiment). Module 113 also has a dedicated system controller 121 (an OPTI 82C693 chip in this embodiment), however, module 113 contains two CPU sockets 117(a) and 117(b) for insertion of, for example, two Intel Pentium CPUs 119(a) and 119(b). CPU modules 112 and 113 may be configured to operate as multi-processor systems as described in commonly assigned, copending U.S. patent application Ser. No. 08/085, 125 for UPGRADEABLE DATA PROCESSING SYSTEM, herein incorporated by reference in its entirety.

When module 112 is inserted in interface slot 115, system 10 operates as a 486-based single processor system. When module 113 is inserted in interface slot 115 and only one Pentium processor 119(a) is inserted in CPU socket 117(a), system 10 becomes a Pentium-based single processor system. The insertion of an additional Pentium processor 119(b) into CPU socket 117(b) would convert system 10 to a Pentium-based multi-processor system. Module 113 includes a data buffer 123 for buffering the 64-bit data from either CPU 119(a) or CPU 119(b). A bus controller (BUSC) 122 on main circuit board 111 contains the circuitry needed for bus arbitration and other purposes and communicates with the devices on the CPU modules through control signals 124. BUSC 122 is able to cooperate with either 486-module 112 or Pentium-module 113, eliminating the need for individual bus controlling circuits for each module. An OPTI 82C696 chip is employed as BUSC 122 in this embodiment.

A memory 126 is located on main circuit board 111. 64-bit data is transferred between memory 126 and the devices on the CPU modules through a 64-bit data bus 127 (MD 0:63). As previously mentioned, the circuitry of CPU modules 112 and 113 may be designed according to copending U.S. patent application Ser. No. 08/085,125. In that application, an architecture is described in which a single processor system may be upgraded to a multi-processor system by the insertion of an additional CPU into an available CPU socket. However, the system of the copending application does not explicitly address the compatibility problem which exists between 32-bit data processing systems and the newer generation of 64-bit microprocessors. The present invention addresses and solves this compatibility problem.

Figure 2A:
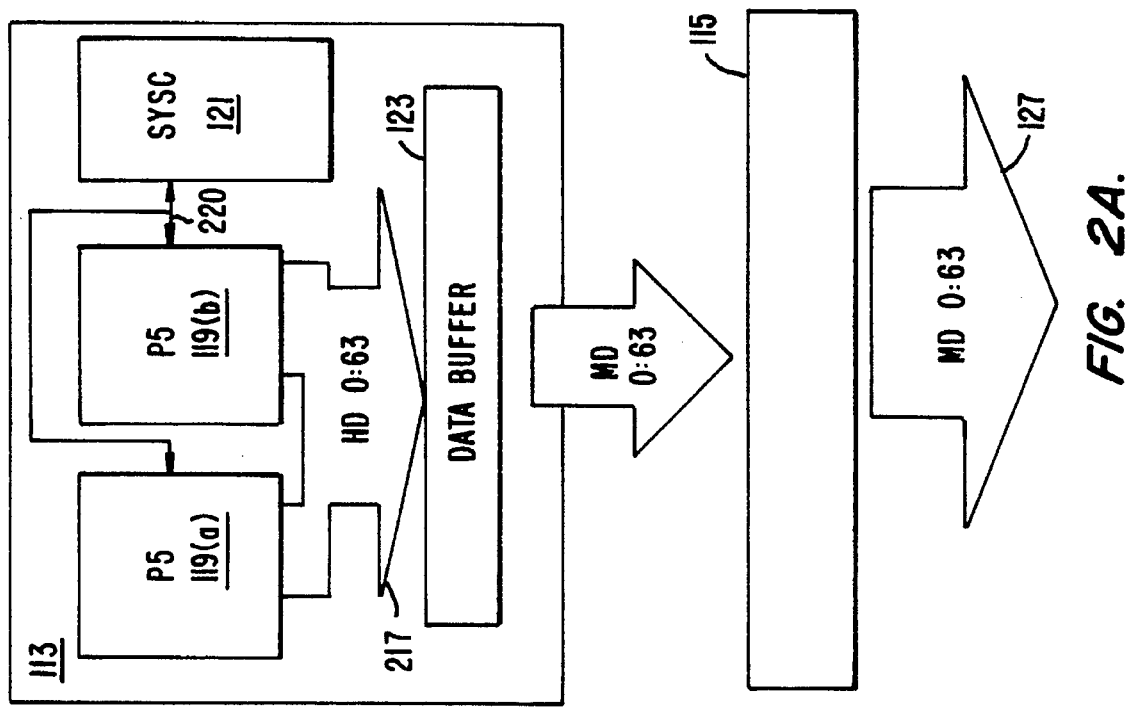
FIG. 2A is a simplified block diagram illustrating the interconnection between a 64-bit CPU module having multiple CPUs and a 64-bit data bus according to a specific embodiment of the invention.
Figure 2B:
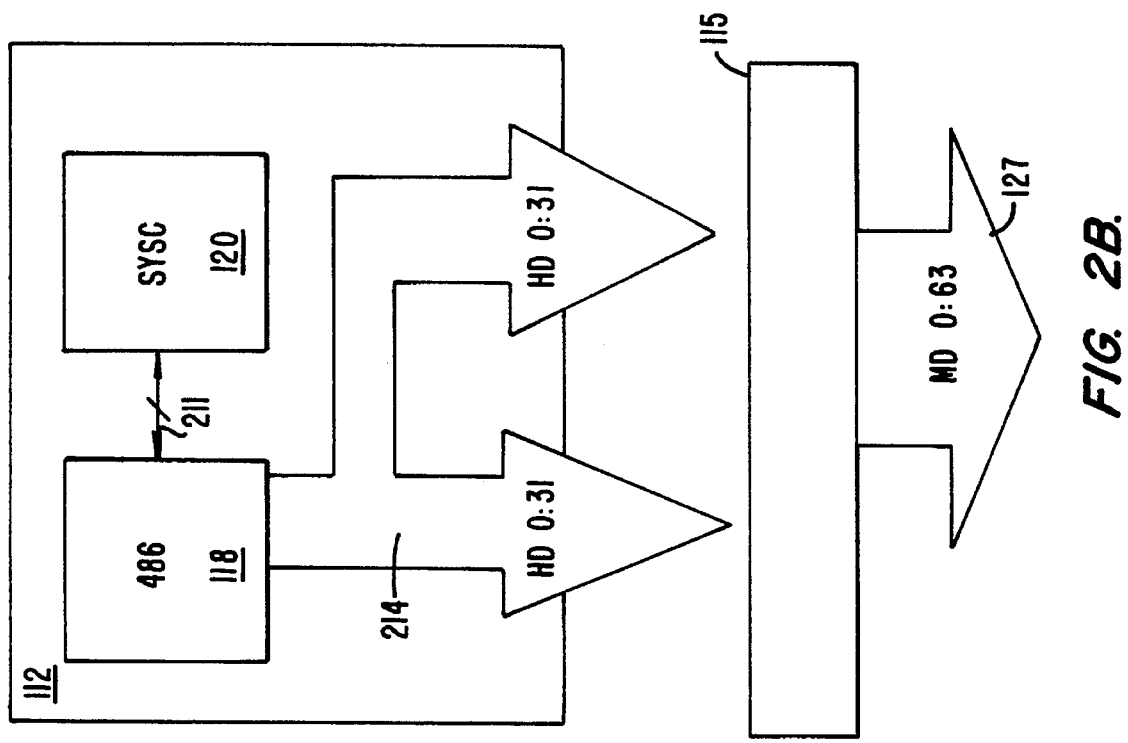
FIG. 2B is a simplified block diagram illustrating the interconnection between a 32-bit CPU module having a single CPU and a 64-bit data bus according to a specific embodiment of the invention.

FIGS. 2A and 2B illustrate the data bus configurations of CPU modules 112 and 113. FIG. 2A is a simplified block diagram illustrating the interconnection between a 64-bit CPU module having multiple CPUs and a 64-bit data bus. The data signals of the two Pentium CPUs 119(a) and 119(b) are tied together to form a data bus 217 (HD 0:63). Data bus 217 communicates through data buffer 123 to data bus 127 (MD 0:63) on main circuit board 111. Only one of CPUs 119(a) and 119(b) provides data on data bus 217 at a time, the data being transmitted through interface slot 115 to data bus 127 (MD 0:63), thereby providing the CPU access to data stored in memory 126 (not shown) on main circuit board 111. When both CPUs 119(a) and 119(b) attempt to access memory 126, SYSC 121 communicates with both CPUs through control signals 220 to arbitrate the use of data bus 217. No conversion mechanism is required to connect the 64-bit data bus 217 with data bus 127 through interface slot 115.

FIG. 2B is a simplified block diagram illustrating the interconnection between a 32-bit CPU module having a single 486 processor and a 64-bit data bus. CPU module 112 contains one 486 processor 118 and a system controller (SYSC) 120 which communicate with each other via control signals 211. The processor 118 employs a data bus 214 having a data width of 32 bits (HD 0:31). In order for data bus 214 to be compatible with the 64-bit data bus 127 (MD 0:63), data bus 214 is duplicated resulting in two parallel sets of data lines HD 0:31 which are sent through module interface slot 115 and matched to the 64 data lines MD 0:63 of data bus 127. This is accomplished by electrically connecting the connector pins on CPU module 112 which mate with the upper half of 64-bit data bus 127 with corresponding connector pins on module 112 which mate with the lower half of data bus 127. For example, the connector pins on CPU module 112 which mate with lines MD0 and MD32 of data bus 127 are both electrically connected to HD0 of data bus 214. Similarly, the connector pins on CPU module 112 which mate with lines MD21 and MD53 of data bus 127 are both electrically connected to HD21 of data bus 214. It will be understood that these electrical connections may be maintained in a variety of ways. For example, according to one embodiment, shorting wires may be hardwired directly at the connector of CPU module 112. According to a different embodiment, duplicate parallel data lines may be provided on CPU module 112 which are connected to the module's connector and which electrically connect the lines of data bus 127 as described above.

Thus, when the CPU module 112 is inserted in interface slot 115, 486 processor 118 can access the system memory on the main circuit board via data bus 214 without encountering the problem of bus incompatibility. The invention therefore is capable of accepting CPU modules having different bus widths. A user can upgrade (or downgrade) the system simply by replacing the CPU module without any further modification such as jumper setting or DIP switch changing.

CPU modules designed according to the present invention may also incorporate some of the features of CPU boards described in copending U.S. patent application Ser. No. 07/872,611 and Ser. No. 07/998,879. For example, a CPU circuit board may be devised upon which a prepared location (e.g., an IC socket) is provided for inserting a new CPU when the original CPU on the board requires an upgrade. Upon insertion of the new CPU into the prepared location, the original CPU is disabled.

Figure 3A:
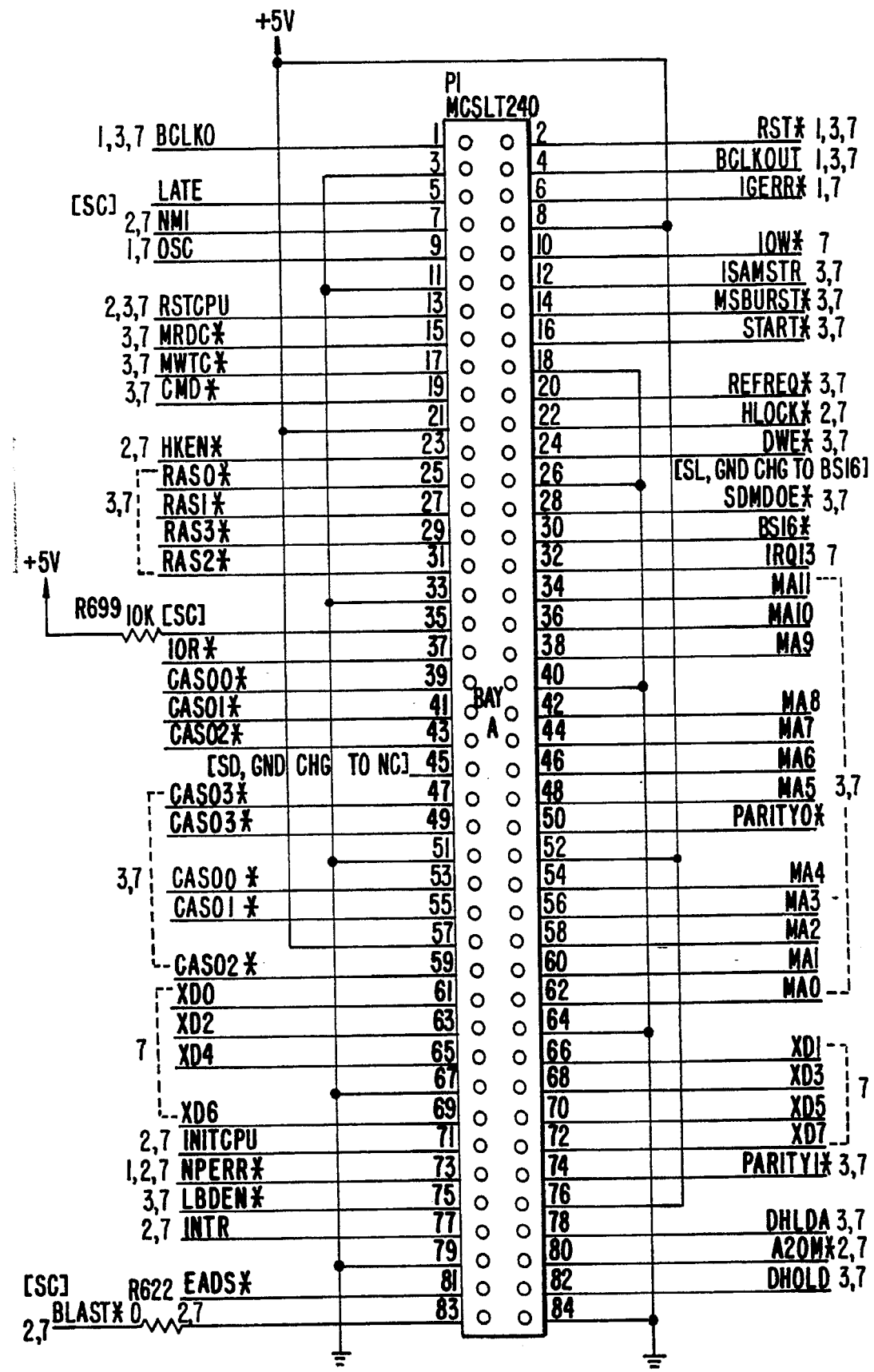
FIGS. 3A–3C are schematic diagrams of sections of the connector for a 32-bit CPU module designed according to a specific embodiment of the invention.
Figure 3B:
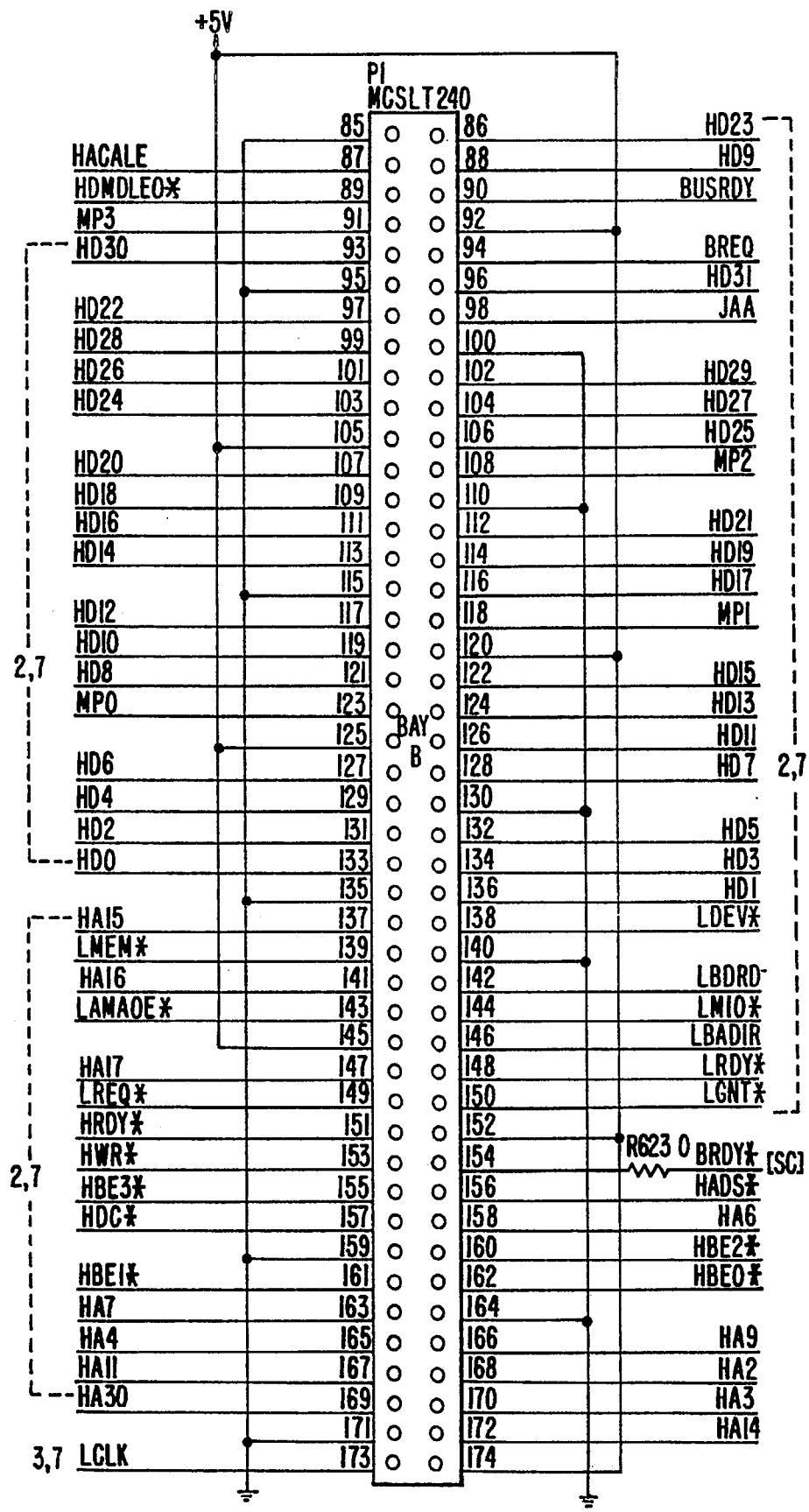
Figure 3C:
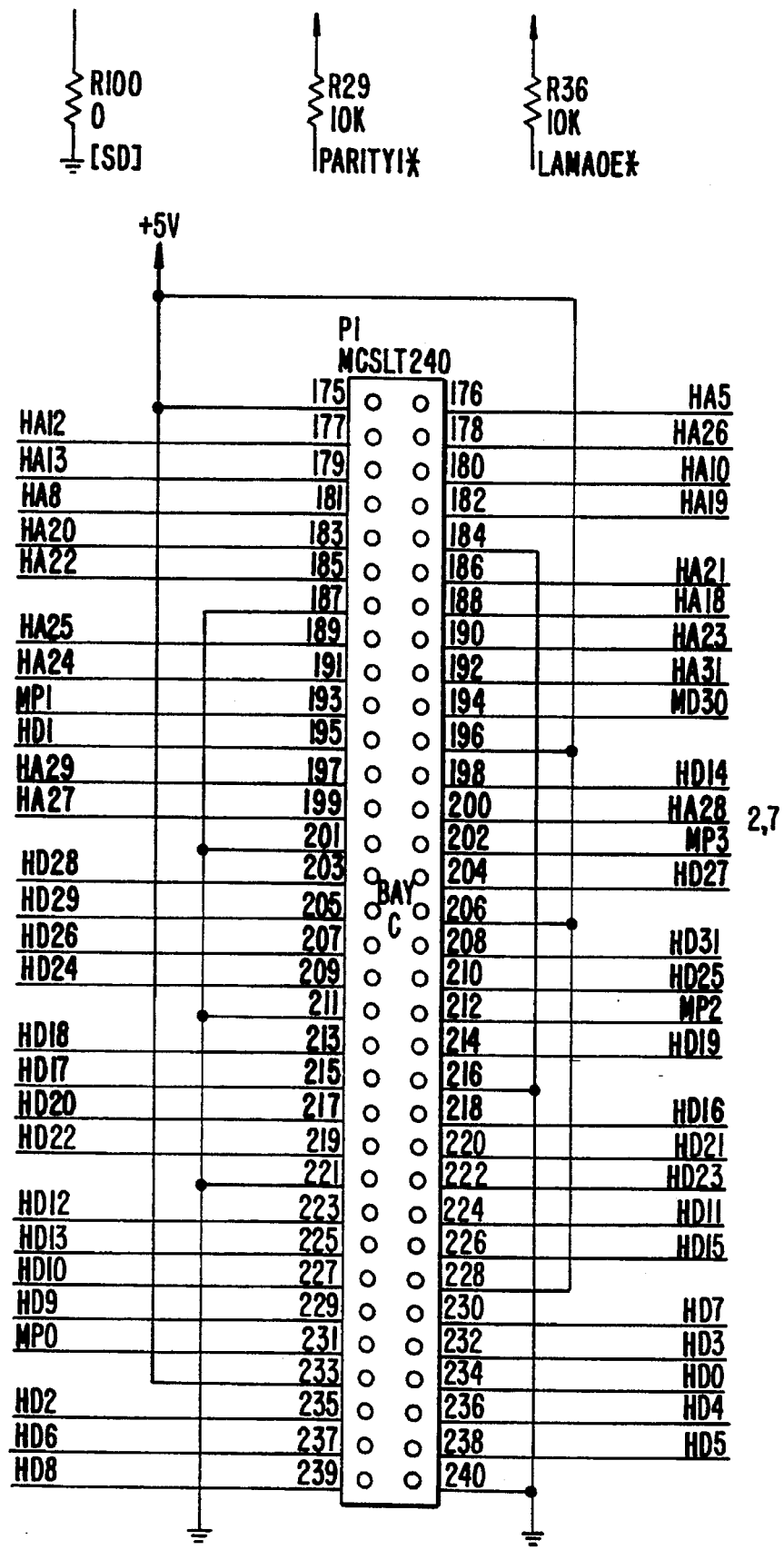

FIGS. 3A–C, 4A–C, and 5A–C are schematic diagrams of module interface connectors designed according to a specific embodiment of the present invention. FIGS. 3A–C are schematic diagrams of sections of the connector for a 32-bit CPU module. Connector P1 is a 240-pin MCSLT240 connector designed by Acer Incorporated. As becomes apparent upon close inspection of the schematic, each HD line is connected to two connector pins. For example, HD23 is connected to pins 86 and 222; HD18 is connected to pins 109 and 213; and so on. Connector P1 comprises "gold fingers" which protrude from the bottom edge of the 32-bit CPU module which mate with a slot on the main board; i.e., connector P3 shown in FIGS. 5A–C.

Figure 4A:
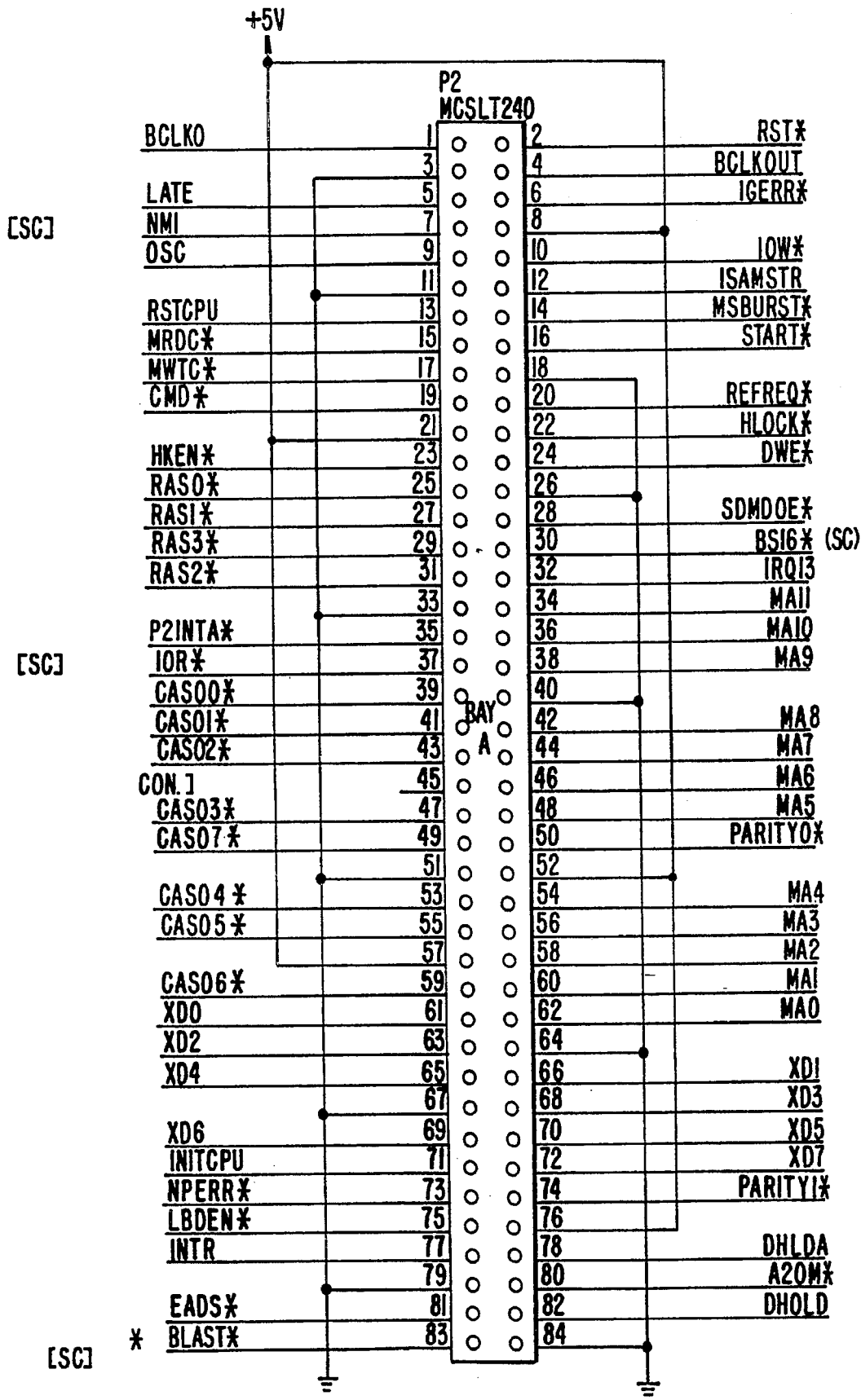
FIGS. 4A–4C are schematic diagrams of sections of the connector for a 64-bit CPU module designed according to a specific embodiment of the invention.
Figure 4B:
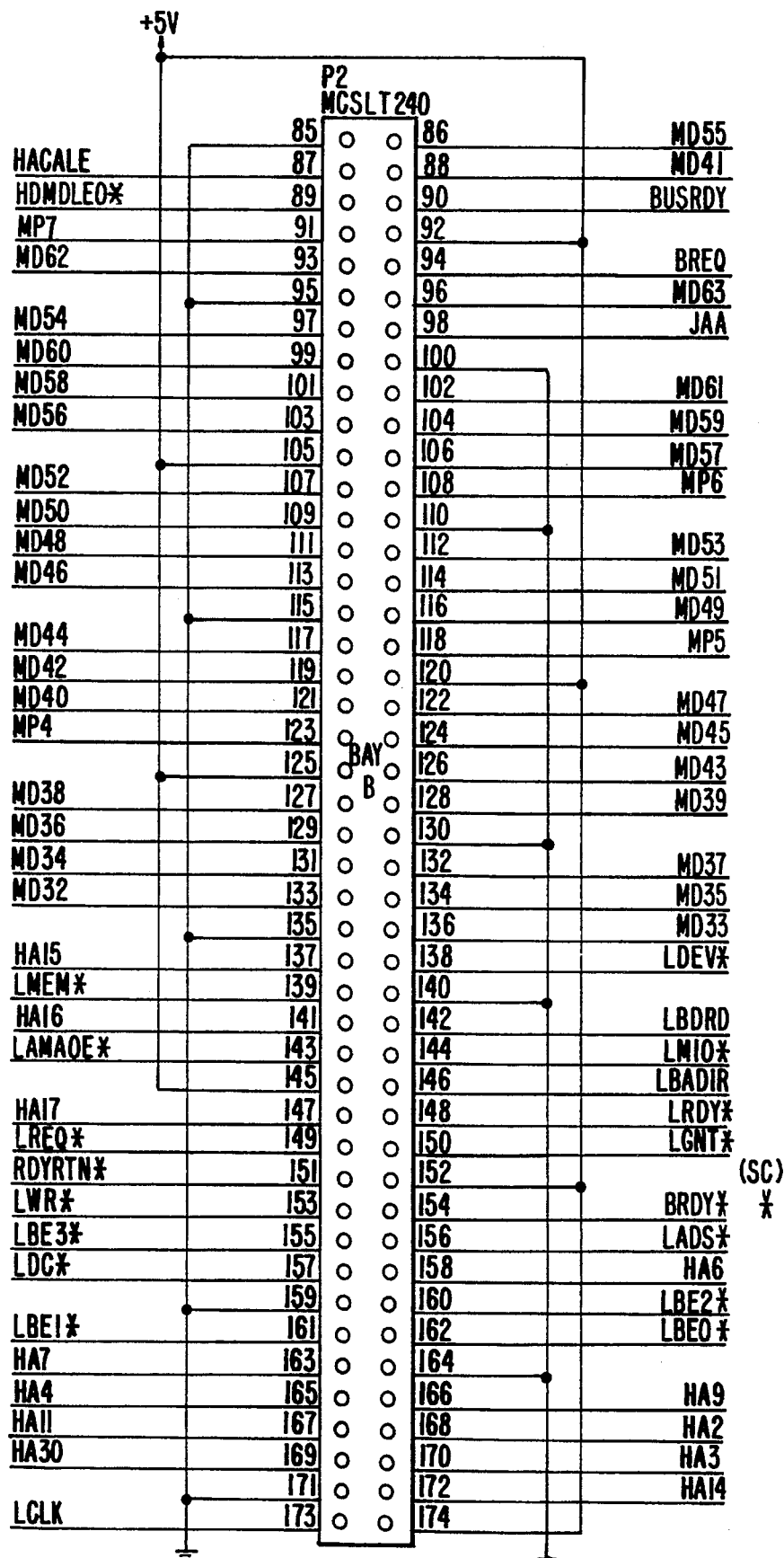
Figure 4C:
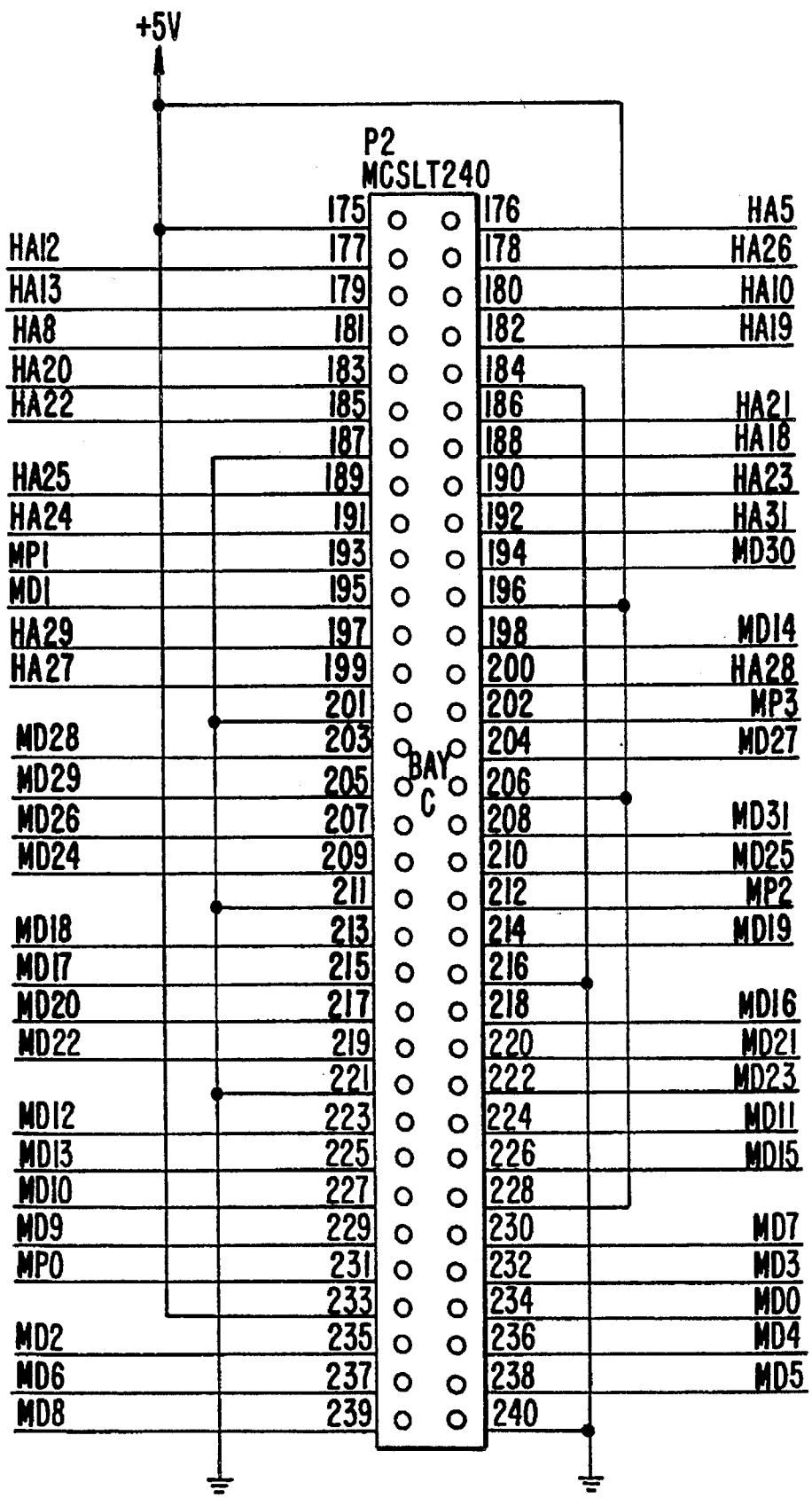

FIGS. 4A–C are schematic diagrams of sections of the connector for a 64-bit CPU module. Connector P2 is also a 240-pin MCSLT240 connector designed by Acer Incorporated. Unlike connector P1, each MD line is connected to only one connector pin. Connector P2 also mates with connector P3.

Figure 5A:
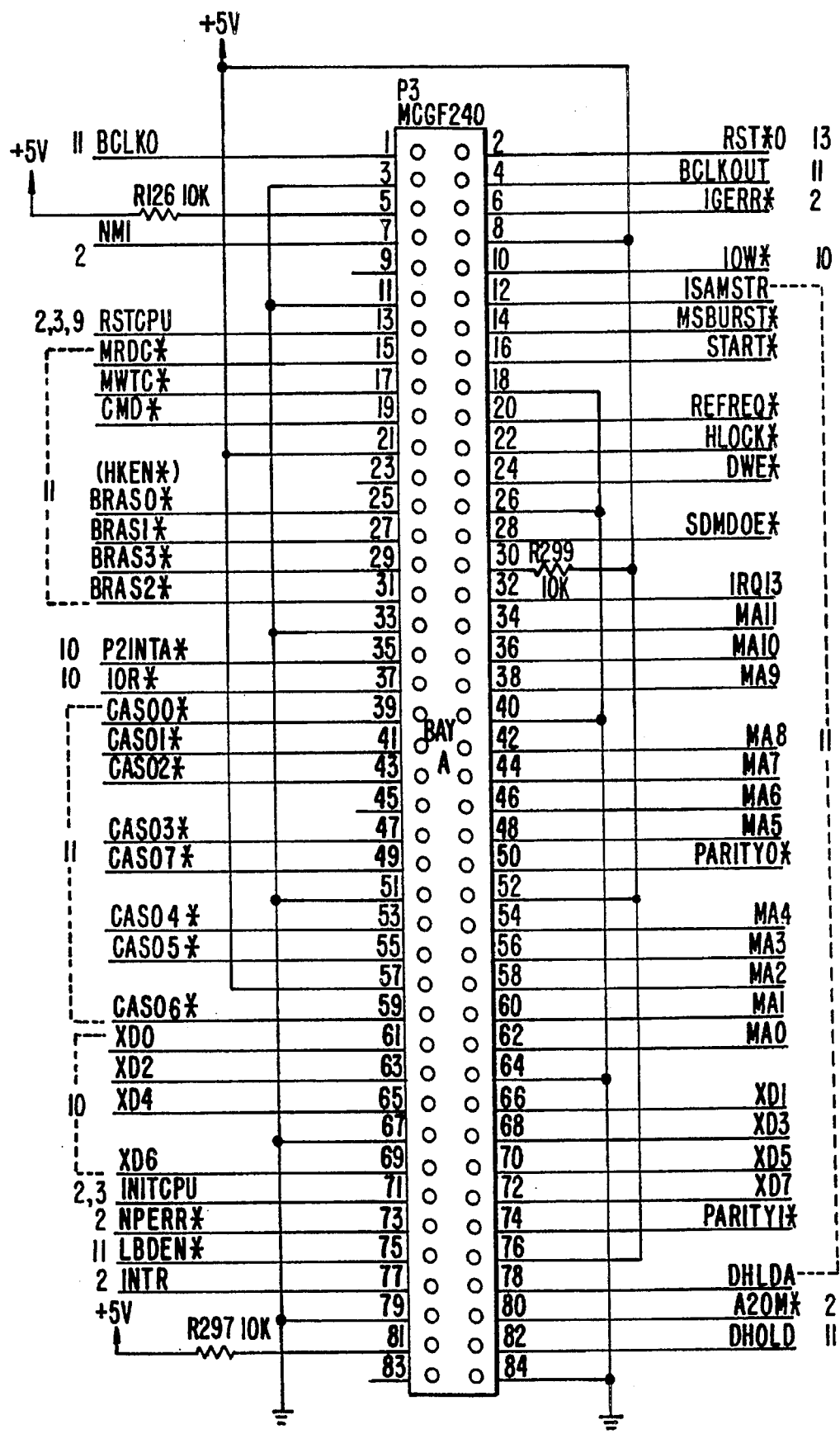
FIGS. 5A–5C are schematic diagrams of sections of a CPU module interface designed according to a specific embodiment of the invention.
Figure 5B:
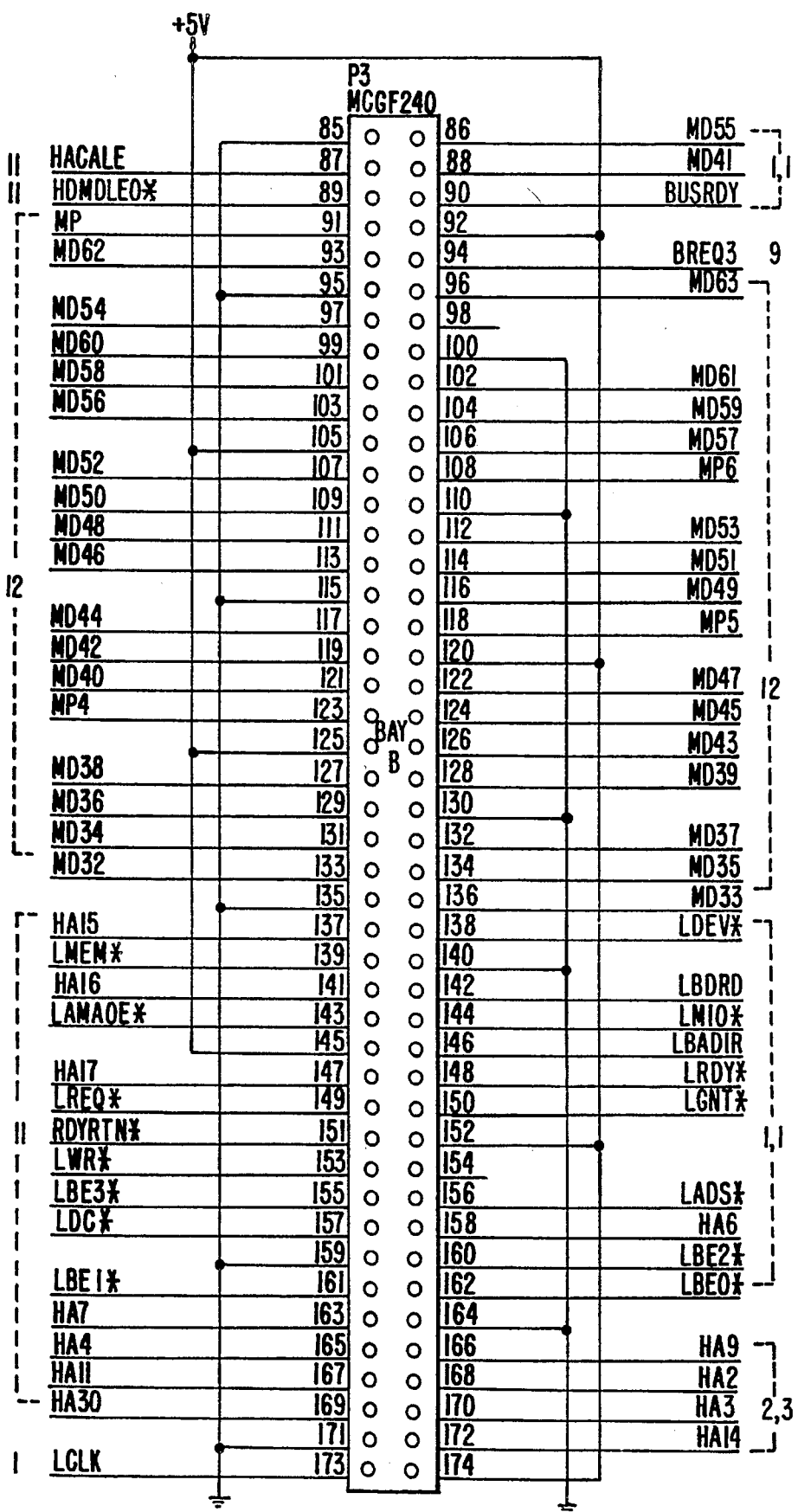
Figure 5C:
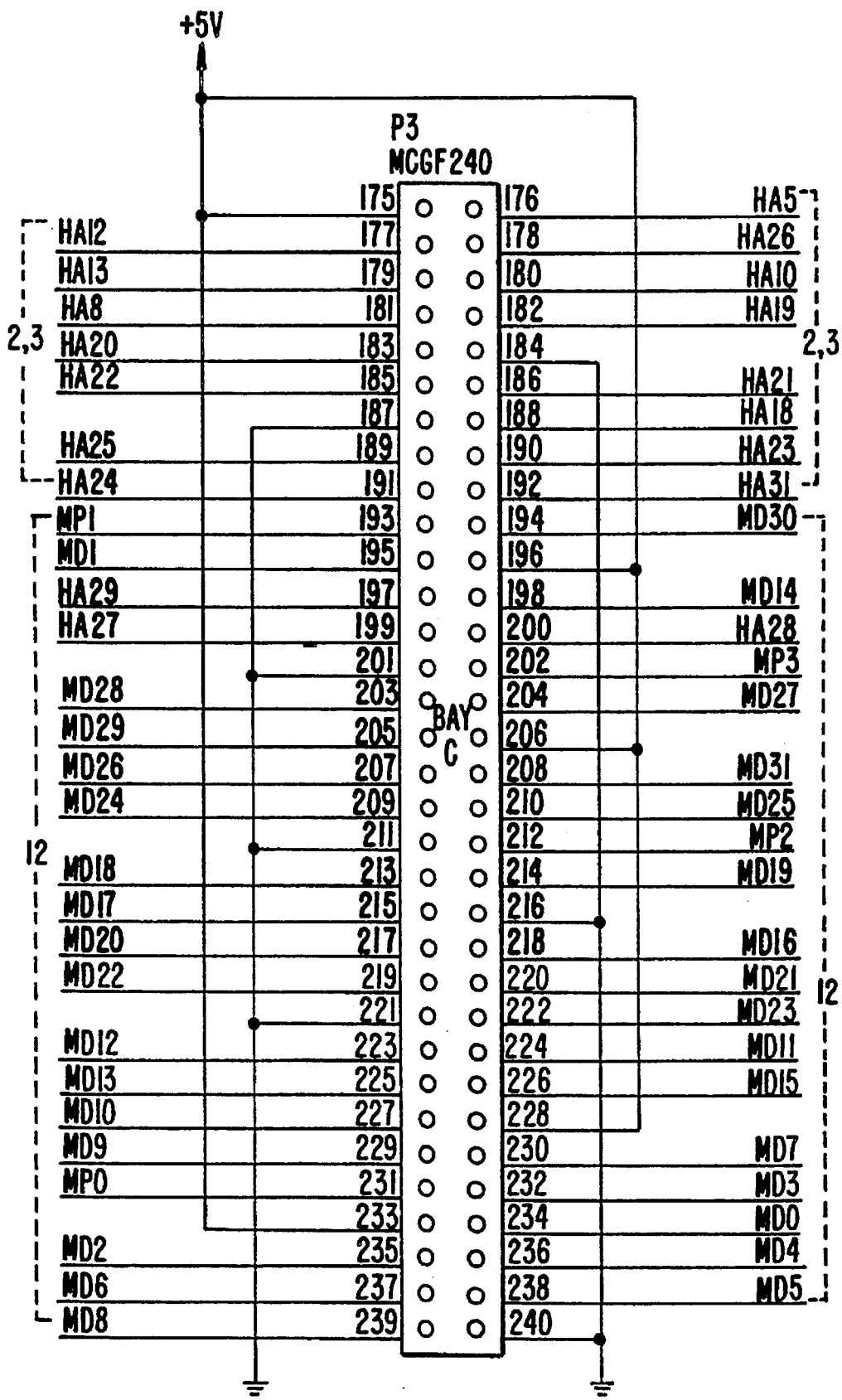

FIGS. 5A–C are schematic diagrams of sections of a CPU module interface connector which is a slot on main board 111. P3 is a 240-pin MCGF240 connector designed by Acer Incorporated. When examined with reference to FIGS. 3A–C, it can be seen that, when connectors P1 and P3 are mated, lines MD0 and MD32 of connector P3 are both electrically connected to HD0 of connector P1. Similarly, lines MD21 and MD53 of connector P3 are both electrically connected to HD21 of connector P1.

Figure 6A:
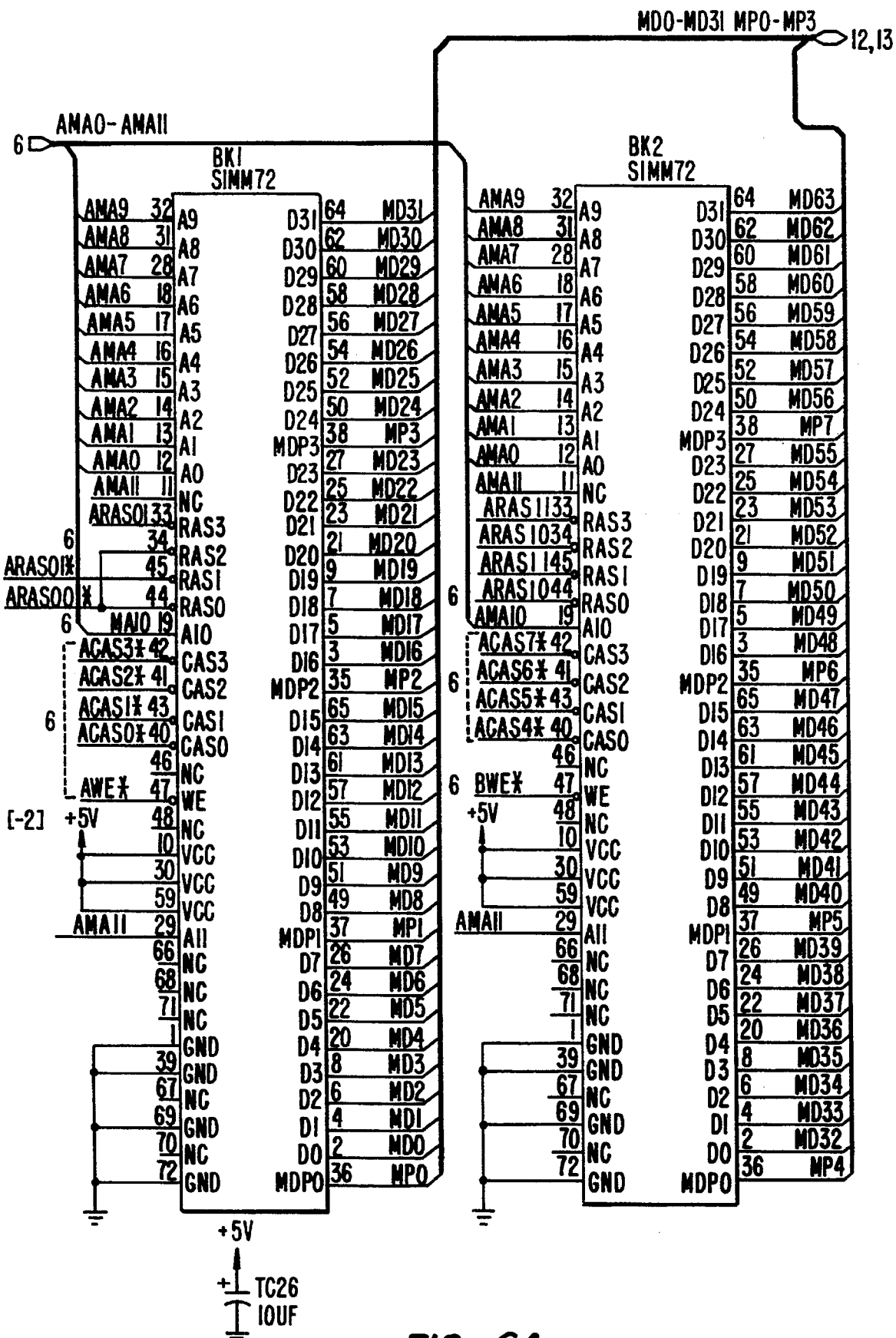
FIGS. 6A and 6B are schematic diagrams of portions of the main memory employed on the main board according to a specific embodiment of the invention.
Figure 6B:
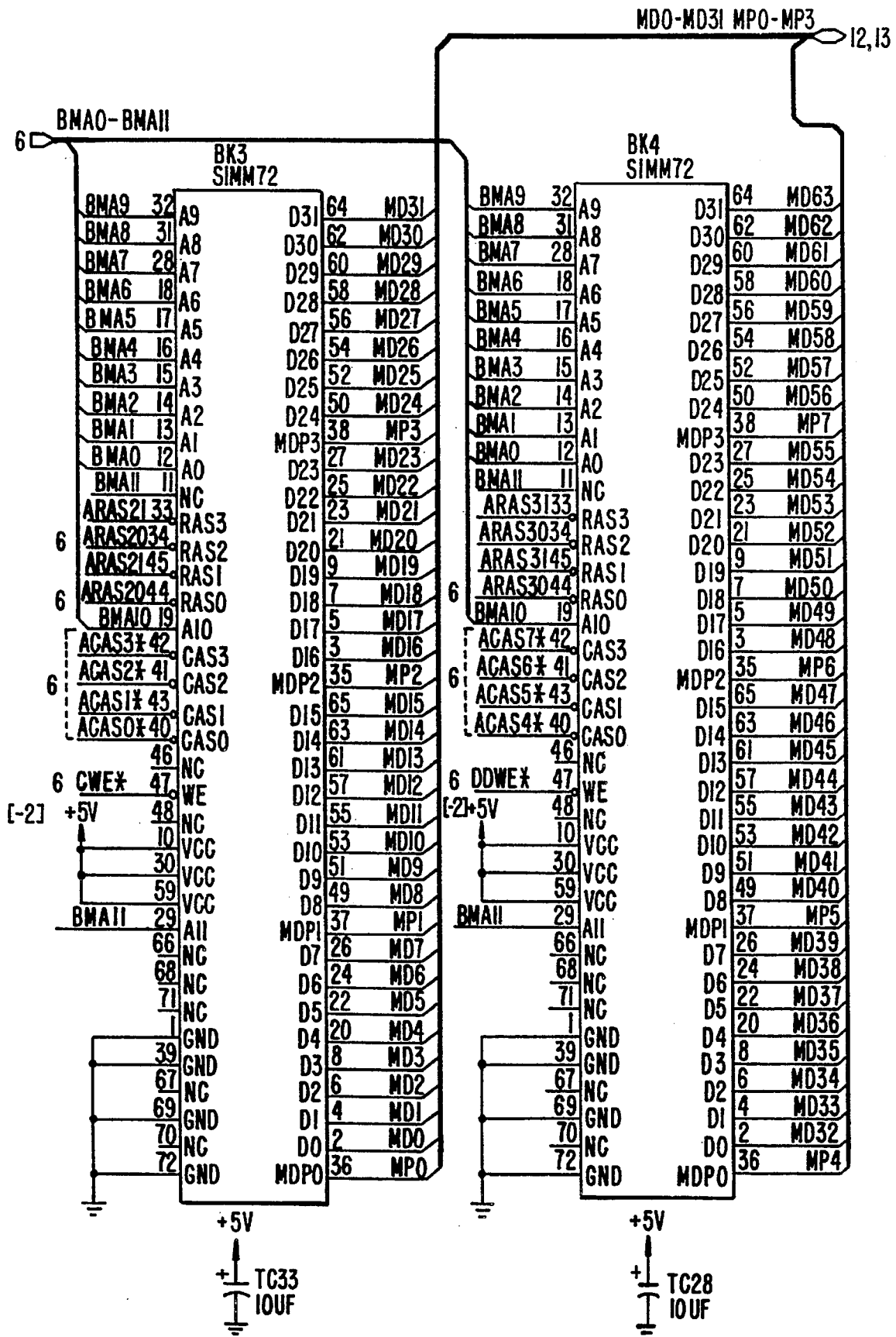

FIGS. 6A and 6B are schematic diagrams of portions of the main memory employed on the main board in the embodiment described with reference to FIGS. 3–5. The schematic illustrates the pin connections and designations of the main memory, and their correspondence with lines MD0:63 of data bus 127 and the pins of connector P3. For the Pentium system, the data bus is connected to two banks of DRAMs. One bank of DRAMs, BK1 and BK3, is connected to lines MD0:31. The other bank, BK2 and BK4, is connected to lines MD32:63. For the 486 system, because the data lines MD0:31 and MD32:63 transmit duplicate data, the data in the first bank (BK1 and BK3) mirrors the data in the second bank (BK2 and BK4).

While the invention has been particularly shown and described with reference to specific embodiments thereof, it will be understood by those skilled in the art that the foregoing and other changes in the form and details may be made therein without departing from the spirit or scope of the invention.

What is claimed is:

1. A removable central processing unit (CPU) module for Use in a data processing system, comprising:

at least one CPU having a first data width;

a first data bus having said first data width coupled to said at least one CPU;

a connector coupled to said first data bus for connecting to a circuit board having a second data bus, said second data bus having a second data width larger than said first data width; and a third data bus coupled to said first data bus and said connector, said third data bus being a duplicate of said first data bus and connected in parallel therewith, thereby facilitating compatibility between said CPU module and said second data bus by transmitting identical data on said first and third data buses substantially simultaneously.

2. The removable CPU module of claim 1 wherein said at least one CPU comprises a 32-bit microprocessor, said first data width is 32-bits, and said second data width is 64 bits.

3. The removable CPU module of claim 2 wherein said at least one CPU comprises a 32-bit 486 microprocessor.

4. A removable central processing unit (CPU) module for use in a data processing system, comprising:

at least one CPU having a first data width;

a first data bus having said first data width coupled to said at least one CPU; and a connector coupled to said first data bus for connecting to a circuit board having a second data bus, said second data bus having a second data width larger than said first data width;

wherein said connector comprises connector pins, each connector pin which corresponds to a signal line in said first data bus being electrically connected to another connector pin, thereby facilitating compatibility between said CPU module and said second data bus by transmitting identical data on each pair of electrically connected connector pins substantially simultaneously.

5. The removable CPU module of claim 4 wherein said at least one CPU comprises a 32-bit microprocessor, said first data width is 32-bits, and said second data width is 64 bits.

6. The removable CPU module of claim 5 wherein said at least one CPU comprises a 32-bit 486 microprocessor.

7. A data processing system, comprising:

a first circuit board, comprising:
     a first data bus having a first data width; and
     a module interface coupled to said first data bus; and a removable central processing unit (CPU) module, comprising:
     at least one CPU having a second data width smaller than said first data width;
     a second data bus having said second data width coupled to said at least one CPU;
     a connector coupled to said second data bus for connecting to Said module interface; and
     a third data bus coupled to said second data bus and said connector, said third data bus being a duplicate of said Second data bus and connected in parallel therewith, thereby facilitating compatibility between said CPU module and said first data bus by transmitting identical data on said second and third data buses substantially simultaneously.

8. The data processing system of claim 7 wherein said at least one CPU comprises a 32-bit microprocessor, said first data width is 64 bits, and said second data width is 32 bits.

9. The data processing system of claim 8 wherein said at least one CPU comprises a 32-bit 486 microprocessor.

10. A data processing system, comprising:
a first circuit board, comprising:
a first data bus having a first data width; and
a module interface coupled to said first data bus; and
a removable central processing unit (CPU) module, comprising:
at least one CPU having a second data width smaller than said first data width;
a second data bus having said second data width coupled to said at least one CPU; and
a connector coupled to said second data bus for connecting to said module interface;
wherein said connector comprises connector pins, each connector pin which corresponds to a signal line in said second data bus being electrically connected to another connector pin, thereby facilitating compatibility between said CPU module and said first data bus by transmitting identical data on each pair of electrically connected connector pins substantially simultaneously.

11. The data processing system of claim 10 wherein said at least one CPU comprises a 32-bit microprocessor, said first data width is 64 bits, and said second data width is bits.

12. The data processing system of claim 11 wherein said at least one CPU comprises a 32-bit 486 microprocessor.

\* \* \* \* \*